US008933794B2

(12) United States Patent
Nakayama et al.

(10) Patent No.: US 8,933,794 B2
(45) Date of Patent: Jan. 13, 2015

(54) VEHICLE PRESENCE NOTIFICATION APPARATUS

(71) Applicants: Denso Corporation, Kariya (JP); Hamanakodenso Co., Ltd., Kosai (JP)

(72) Inventors: Toshiaki Nakayama, Miyoshi (JP); Koji Suzuki, Hamamatsu (JP); Keijirou Hanada, Toyokawa (JP)

(73) Assignees: Denso Corporation, Kariya (JP); Hamanakodenso Co., Ltd., Kosai (JP)

( * ) Notice: Subject to any disclaimer, the term of this patent is extended or adjusted under 35 U.S.C. 154(b) by 44 days.

(21) Appl. No.: 13/662,913

(22) Filed: Oct. 29, 2012

(65) Prior Publication Data
US 2013/0106590 A1    May 2, 2013

(30) Foreign Application Priority Data

Oct. 31, 2011  (JP) ................. 2011-238815
Jan. 19, 2012  (JP) ................. 2012-009062
Apr. 5, 2012   (JP) ................. 2012-086821

(51) Int. Cl.
*H05K 5/00*  (2006.01)
*B60L 3/00*  (2006.01)
*H04R 1/30*  (2006.01)
*B60Q 5/00*  (2006.01)
*H04R 1/28*  (2006.01)
*H04R 17/00* (2006.01)

(52) U.S. Cl.
CPC ... *B60L 3/00* (2013.01); *H04R 1/30* (2013.01); *B60Q 5/008* (2013.01); *H04R 1/2857* (2013.01); *H04R 17/00* (2013.01); *H04R 2499/13* (2013.01); *B60L 2270/42* (2013.01)

USPC ............... 340/384.3; 340/384.7; 340/388.1; 381/61; 381/86; 705/26.41; 705/26.1

(58) Field of Classification Search
USPC ............ 340/441, 384.3, 384.7, 388.1–396.1; 701/22; 381/61, 86; 446/409, 397; 705/26.41, 26.1
See application file for complete search history.

(56) References Cited

U.S. PATENT DOCUMENTS 4,923,031 A * 5/1990 Carlson ................. 181/144
5,414,406 A * 5/1995 Baxter ................... 340/388.1
5,635,903 A * 6/1997 Koike et al. ............ 340/441

(Continued)

FOREIGN PATENT DOCUMENTS

JP   10-201001      7/1998
JP   2000-102091 A  4/2000

(Continued)

OTHER PUBLICATIONS

Nakayama, et al., U.S. Appl. No. 13/899,097, filed May 21, 2013.

(Continued)

*Primary Examiner* — Brent Swarthout
(74) *Attorney, Agent, or Firm* — Nixon & Vanderhye P.C.

(57) ABSTRACT

A vehicle presence notification apparatus notifying a presence of a vehicle includes an alarm device and a dynamic speaker. The alarm device includes an alarm generator generating an alarm sound and an acoustic tube through which the alarm sound is emitted outside of the vehicle. The dynamic speaker generates a notification sound with audible frequency. The dynamic speaker is fixed to the acoustic tube and emits the notification sound inside of the acoustic tube, such that the notification sound is generated outside of the vehicle through the acoustic tube.

3 Claims, 6 Drawing Sheets

(56) References Cited

U.S. PATENT DOCUMENTS

| | | | | | |
|---|---|---|---|---|---|
| 5,635,912 | A | * | 6/1997 | McCracken | 340/692 |
| 5,751,827 | A | * | 5/1998 | Takahashi | 381/190 |
| 2010/0266135 | A1 | * | 10/2010 | Theobald et al. | 381/71.4 |

FOREIGN PATENT DOCUMENTS

| WO | WO 2011/098881 | 8/2011 |
|---|---|---|
| WO | WO 2011/098882 | 8/2011 |

OTHER PUBLICATIONS

Nakayama, et al., U.S. Appl. No. 13/898,935, filed May 21, 2013.
Nakayama, et al., U.S. Appl. No. 13/845,719, filed Mar. 18, 2013.
Nakayama, et al., U.S. Appl. No. 13/898,833, filed May 21, 2013.
Notification of the First Office Action issued in corresponding Chinese Application No. 201210426543.0 issued on Jul. 16, 2014 (with translation).

* cited by examiner

VEHICLE PRESENCE NOTIFICATION APPARATUS

CROSS REFERENCE TO RELATED APPLICATION

This application is based on Japanese Patent Application No. 2011-238815 filed on Oct. 31, 2011, Japanese Patent Application No. 2012-9062 filed on Jan. 19, 2012, and Japanese Patent Application No. 2012-86821 filed on Apr. 5, 2012, the disclosures of which are incorporated herein by reference in their entirety.

TECHNICAL FIELD

The present disclosure relates to a vehicle presence notification apparatus.

BACKGROUND

JP-10-201001A describes a vehicle presence notification apparatus which notifies a presence of a vehicle for a circumference of the vehicle by outputting a notification sound. The vehicle presence notification apparatus generates the notification sound using a dynamic speaker which directly generates audible sound (acoustic wave with audible frequency).

The notification sound such as false engine sound, chord, voice sound, or music is required not to be felt noisy while an alarm (warning) sound produced by an alarm device such as horn may be noisy to some extent. For example, low-pitched sound with frequency component of 600 Hz or less is mixed in the notification sound to reduce the noisiness.

The dynamic speaker is what is called a cone speaker in which a cone paper (diaphragm) directly drives air. In such dynamic speaker, it is difficult to produce the low-pitched sound, so it is required to make the cone paper larger to raise the sound pressure of the low-pitched sound like a woofer. However, it is difficult to mount the large-sized speaker to the vehicle, and the large-sized speaker causes increase in the cost.

SUMMARY

It is an object of the present disclosure to provide a vehicle presence notification apparatus that can produce low-pitched sound with low cost.

According to an example of the present disclosure, a vehicle presence notification apparatus notifying a presence of a vehicle includes an alarm device and a dynamic speaker. The alarm device includes an alarm generator generating an alarm sound and an acoustic tube through which the alarm sound is emitted outside of the vehicle. The dynamic speaker generates a notification sound with audible frequency. The dynamic speaker is fixed to the acoustic tube and emits the notification sound inside of the acoustic tube, such that the notification sound is generated outside of the vehicle through the acoustic tube.

Accordingly, the vehicle presence notification sound can produce low-pitched sound with low cost.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1A:
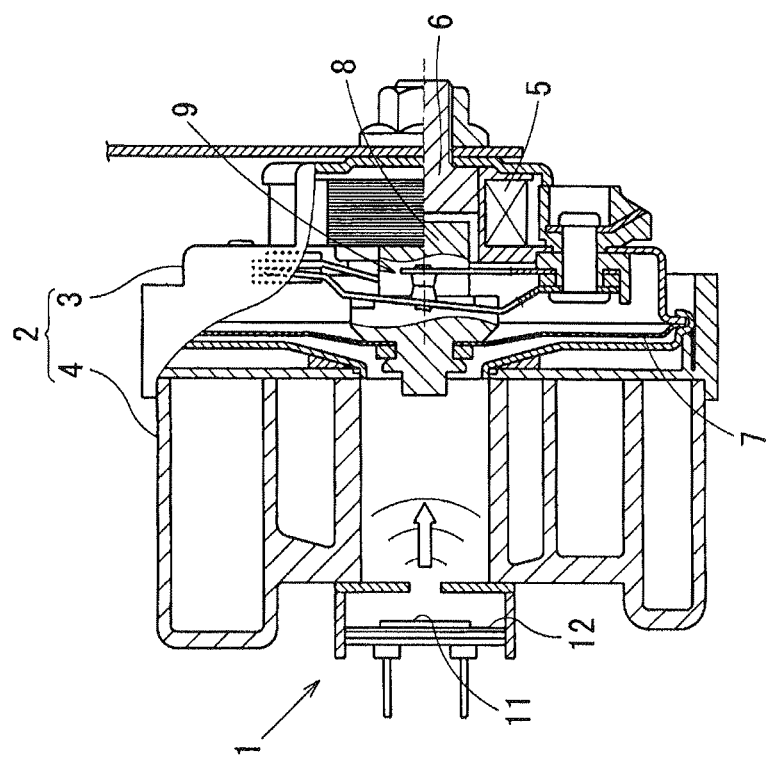
FIG. 1A is a front view illustrating a vehicle presence notification apparatus according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

A vehicle presence notification apparatus generates a notification sound out of a vehicle when a predetermined condition is satisfied. The notification sound is generated by a dynamic speaker such as piezoelectric speaker which generates an audible sound.

The dynamic speaker is different from an alarm generator of an electromagnetic alarm device, and is attached to an acoustic tube of the alarm device. The notification sound is emitted into the acoustic tube from the dynamic speaker. Thereby, the notification sound generated by the dynamic speaker is enhanced by the acoustic tube. Further, the low-pitched component contained in the notification sound is amplified by the acoustic tube, and the amplified sound is emitted out of the vehicle.

An embodiment described below is an example and the present disclosure is not limited to the embodiment.

First Embodiment

A first embodiment will be described with reference to FIGS. 1A, 1B, 2, 3 and 4.

A vehicle presence notification apparatus according to the first embodiment notifies a presence of a vehicle using a notification sound such as false engine sound, chord, voice sound, or music. For example, the vehicle presence notification apparatus is used for an electric vehicle not equipped with an engine, such as electric car or fuel-cell electric car. Alternatively, the vehicle presence notification apparatus is used for a hybrid car, in which an engine is suspended while the hybrid car is traveling or stopped, or is used for an idling stop vehicle having a possibility to suspend an engine when the idling stop vehicle is stopped. Moreover, the vehicle presence notification apparatus may be mounted to a quiet vehicle driven by an engine.

The vehicle has an electromagnetically-operated alarm device 2 shown in FIG. 1A, which generates an alarm sound. Specifically, the alarm device 2 is a vehicular horn generating a warning sound when a driver of the vehicle operates a horn button (not shown) fixed to a steering (not shown). For example, the alarm device 2 is fixed between a front grille (not shown) and a heat exchanger (not shown) such as radiator for air-conditioning in the vehicle. Air is drawn through the front grille when the vehicle is traveling.

Figure 1B:
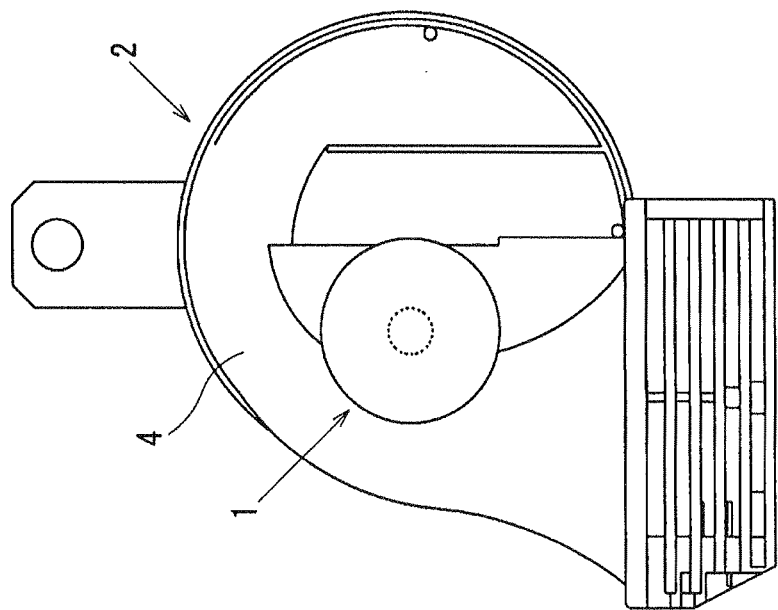
FIG. 1B is a cross-sectional view illustrating the vehicle presence notification apparatus.

As shown in FIG. 1B, the alarm device 2 has an alarm sound generator 3 and a swirl acoustic tube 4. When the sound generator 3 is energized, the sound generator 3 generates a warning sound. The warning sound generated by the generator 3 is enhanced and increased by the tube 4, and is emitted out of the vehicle.

The alarm sound generator 3 includes a coil 5, a fixed iron core 6, a movable iron core 8 and a current interrupter 9. The coil 5 generates magnetic force by being supplied with electricity. The fixed iron core 6 (attraction core) generates magnetic attraction force by the magnetic force generated by the coil 5. The movable iron core 8 (movable core) is supported at the central part of a diaphragm 7 to be movable toward the fixed iron core 6. The current interrupter 9 intermittently turns on an energization circuit of the coil 5 when the coil 5 is energized.

Figure 2:
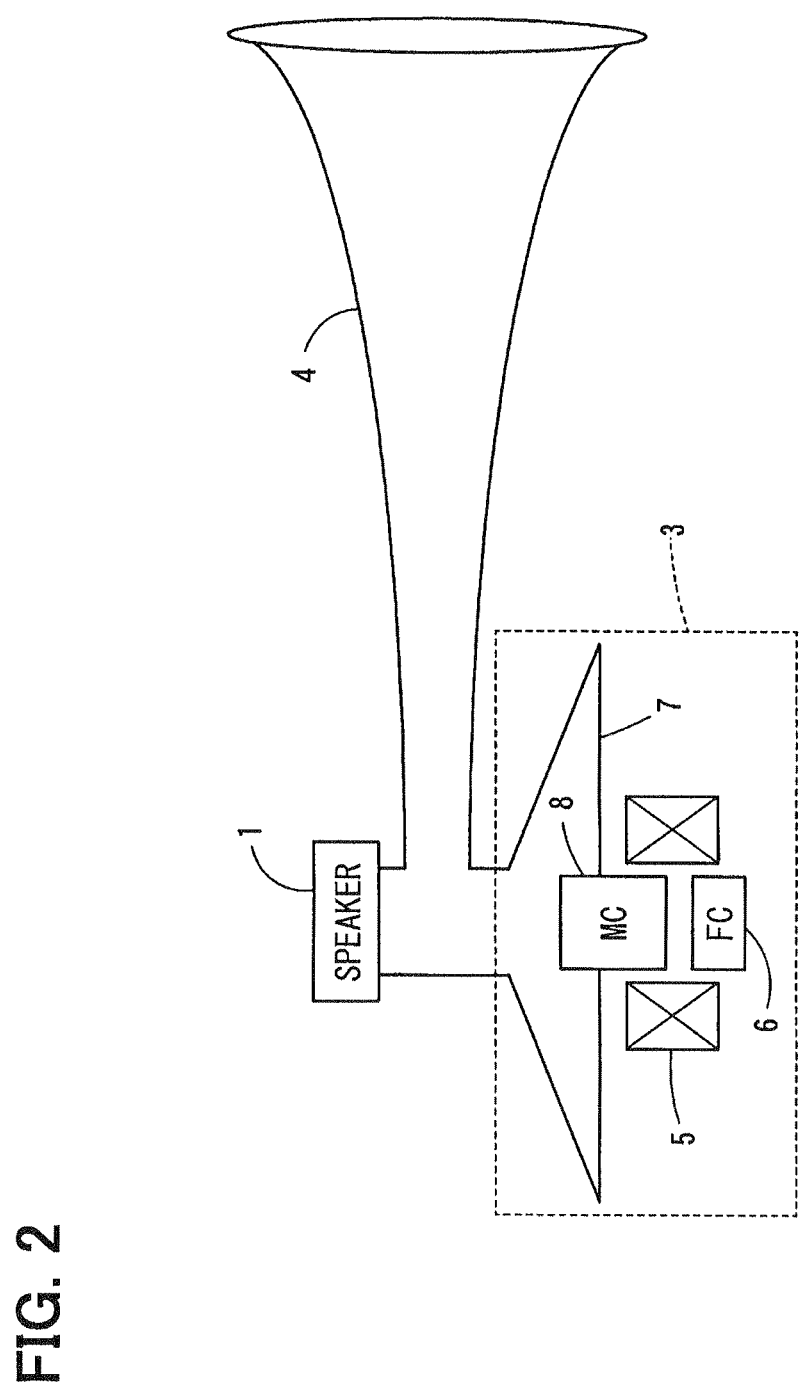
FIG. 2 is a schematic view illustrating the vehicle presence notification apparatus.

The swirl acoustic tube 4 is a swirl horn portion having a spiral shape shown in FIGS. 1A and 1B. Further, as shown in FIG. 2, the swirl acoustic tube 4 has a trumpet portion in which a sound passage is enlarged from a sound inlet to a sound outlet.

As shown in FIG. 1B, the alarm sound generator 3 is attached to a side face of the acoustic tube 4. The side face is perpendicular to an axis of the tube 4, which passes through a center of the swirl shape. For example, the side face opposes to the heat exchanger (not shown) when the tube 4 is mounted between the front grill and the heat exchanger in the vehicle. The alarm sound generator 3 is arranged in a manner that a warning sound is generated into the sound inlet located at the central part of the tube 4.

Figure 3:
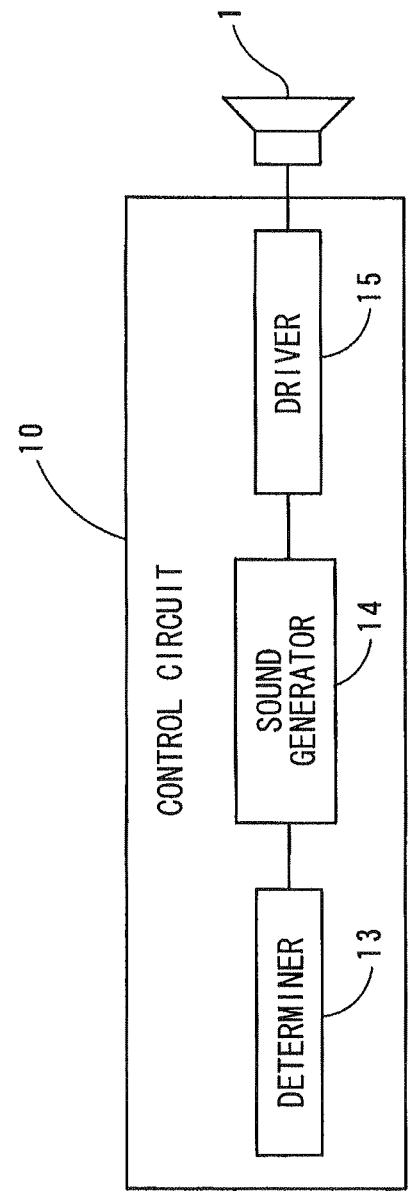
FIG. 3 is a block diagram illustrating a dynamic speaker of the vehicle presence notification apparatus.

As shown in FIG. 3, the vehicle presence notification apparatus is constructed to include a piezoelectric (dynamic) speaker 1 and a control device 10. The speaker 1 generates a notification sound constructed by audible sound. The control device 10 controls the piezoelectric speaker 1.

The piezoelectric speaker 1 is provided to generate an acoustic wave in an audible band region, and has a vibration system constructed by a piezoelectric element 11 and a diaphragm 12, as shown in FIG. 1B. The vibration system has a primary resonance frequency (primary resonance portion) such as about 2 kHz within the audible band region.

Specifically, the piezoelectric speaker 1 may be originally provided to offer information of the vehicle for an occupant of the vehicle through acoustic means such as voice sound or beep sound. The piezoelectric element 11 is displaced by expanding or shrinking (charge or discharge) in accordance with a voltage applied to the piezoelectric element 11. The diaphragm 12 is driven by the expansion and the contraction of the piezoelectric element 11, and produces a loose-and-dense wave in the air.

The information of the vehicle is input into the control device 10 from an engine control unit (ECU). When a predetermined condition is satisfied to notify a presence of the vehicle, the control device 10 controls the piezoelectric speaker 1 to output a notification sound.

As shown in FIG. 3, the control device 10 includes a determiner 13, a sound generator 14 and a driving amplifier 15.

The determiner 13 determines whether the operational status of the vehicle meets the predetermined condition of generating the notification sound. The sound generator 14 generates a frequency (audible sound) signal instructing the notification sound when the determiner 13 determines that the operational status of the vehicle meets the predetermined condition. The driving amplifier 15 drives the piezoelectric speaker 1 by amplifying the frequency signal output from the sound generator 14.

For example, when the speed of the vehicle is lower than or equal to a predetermined speed such as 20 km/h, the determiner 13 determines that the operational status of the vehicle meets the predetermined condition, and the determiner 13 activates the sound generator 14.

The sound generator 14 may be constructed by a sound generating program (sound software), and produces the frequency signal instructing the notification sound using a digital technology, when an instruction signal is provided from the determiner 13. The frequency signal is an electric signal with audio frequency.

Specifically, the vehicle presence notification apparatus emits a notification sound containing a low-pitched frequency component outward from the vehicle. The sound generator 14 is configured to generate the frequency signal containing the low-pitched frequency component.

The driving amplifier 15 is an amplifier such as Class-B amplifier or Class-D amplifier driving the piezoelectric speaker 1 based on the frequency signal output from the sound generator 14. The driving amplifier 15 controls the charge-and-discharge state of the piezoelectric element 11 by controlling a voltage applied to the piezoelectric speaker 1 such that an acoustic wave corresponding to the notification sound (audible sound) is generated from the piezoelectric speaker 1.

Figure 4:
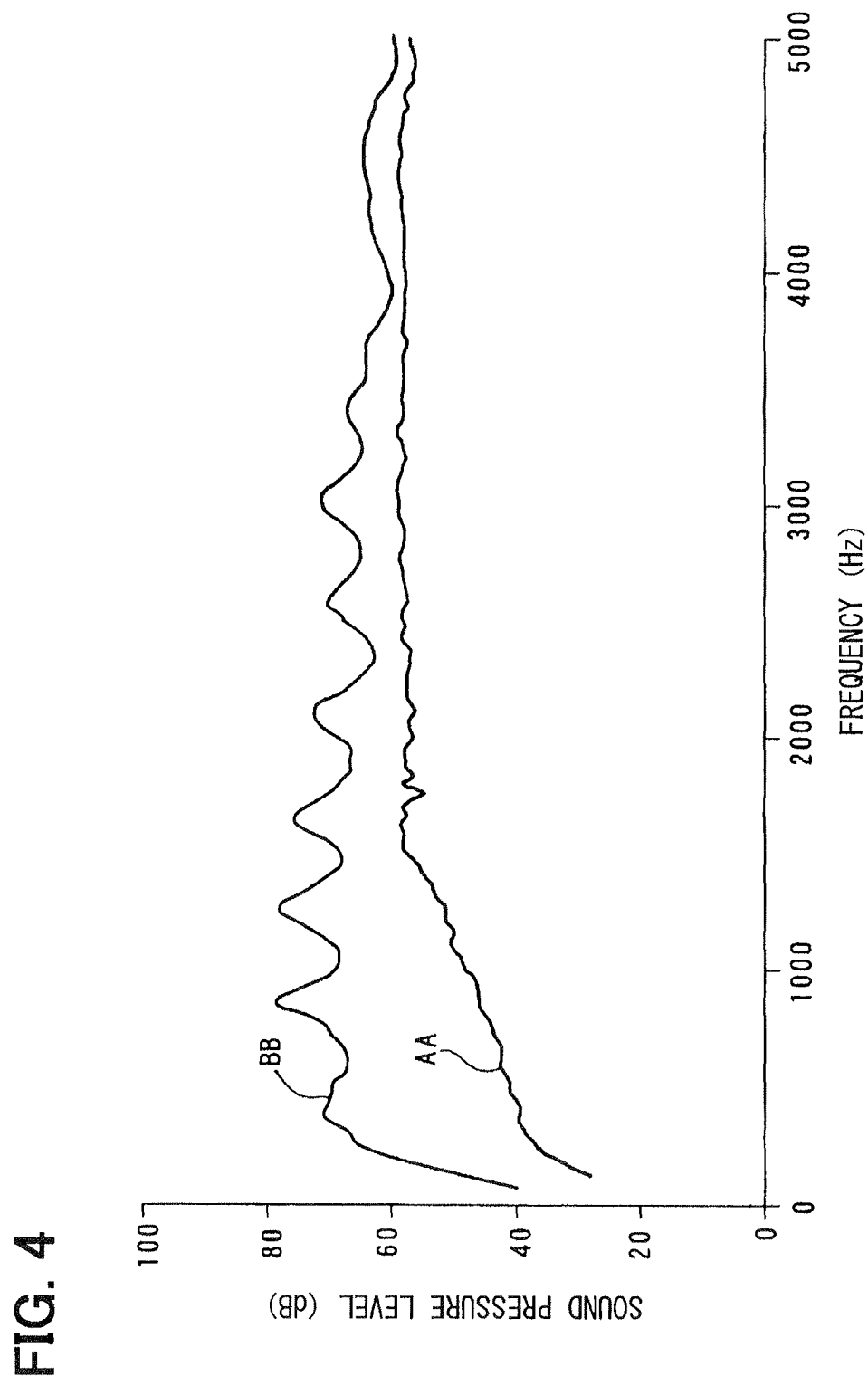
FIG. 4 is a graph illustrating frequency characteristics of a notification sound emitted from the vehicle presence notification apparatus in comparison with a conventional art.

A continuous line AA of FIG. 4 represents frequency characteristics of a sound reproduced by a single piezoelectric speaker which directly emits the sound into air, as a comparison example, when a sine-wave sweep signal having a predetermined voltage is applied to the single piezoelectric speaker. The sweep signal represents a variable signal varied from low frequency to high frequency.

As can be read from the line AA of FIG. 4, the sound pressure of the low-pitched sound is low in the comparison example because it is difficult for the single (small-sized) dynamic speaker to generate a loose-and-dense wave of air with low frequency.

In contrast, according to the first embodiment, as shown in FIG. 1, the piezoelectric speaker 1 is attached to the swirl acoustic tube 4 of the alarm device 2. Further, the piezoelectric speaker 1 is positioned in a manner that the notification sound emitted from the piezoelectric speaker 1 is output into the central part of the swirl acoustic tube 4.

Thus, the notification sound emitted from the piezoelectric speaker 1 is emitted outside of the vehicle through the swirl acoustic tube 4, thereby amplifying the low-pitched sound output from the piezoelectric speaker 1 by the swirl acoustic tube 4.

A continuous line BB of FIG. 4 represents frequency characteristics of reproduced sound emitted from the piezoelectric speaker 1 through the acoustic tube 4 according to the first embodiment, when a sine-wave sweep signal having a predetermined voltage is applied to the piezoelectric speaker 1 which is mounted to the tube 4.

As can be read from the continuous line BB of FIG. 4, even if the piezoelectric speaker 1 is small, aerial vibration generated by the piezoelectric speaker 1 is enhanced and increased by the acoustic tube 4 in a manner that aerial vibration with low frequency can be emitted out of the acoustic tube 4 as low-pitched sound (acoustic wave). Thus, the sound pressure of the low-pitched sound can be raised in the first embodiment, compared with the comparison example.

According to the first embodiment, the vehicle presence notification apparatus includes the piezoelectric speaker 1 that generates a notification sound. By using the acoustic tube 4 of the alarm device 2, the sound pressure of the low-pitched sound can be raised without using a large-sized dynamic speaker such as woofer.

Therefore, the cost for generating the low-pitched sound can be reduced. That is, the cost of the vehicle presence notification apparatus which can generate low-pitched sound (notification sound containing low-pitched sound) can be reduced.

According to the first embodiment, the piezoelectric speaker 1 generating audible sound is used as an example of a small-sized dynamic speaker. The piezoelectric speaker 1 has high flexibility and is low-cost, therefore the cost of the vehicle presence notification apparatus can be lowered.

The piezoelectric speaker 1 is small and lightweight, and is easily mounted to the alarm device 2, as compared with a cone speaker. Moreover, the size and the weight of the alarm device 2, to which the piezoelectric speaker 1 is attached, can be restricted from increasing. Therefore, the vehicle presence notification apparatus can be easily mounted to the vehicle.

Furthermore, an acoustic wave outlet of the piezoelectric speaker 1 has small-size. Therefore, the notification sound generated by the piezoelectric speaker 1 can easily enter the sound inlet of the acoustic tube 4.

According to the first embodiment, the piezoelectric speaker 1 is positioned opposite from the alarm sound generator 3 through the acoustic tube 4. Specifically, the piezoelectric speaker 1 is attached to the other side face of the acoustic tube 4, different from the side face to which the alarm sound generator 3 is attached. The other side face is perpendicular to the axis of the tube 4, which passes through the center of the swirl shape. For example, the other side face opposes to the front grill when the acoustic tube 4 is mounted between the front grill and the heat exchanger in the vehicle. The piezoelectric speaker 1 is arranged in a manner that the notification sound is output into the sound inlet located at the central part of the tube 4.

Thus, the piezoelectric speaker 1 is attached to the acoustic tube 4 so as to be located opposite from the alarm sound generator 3, so the piezoelectric speaker 1 can be easily mounted to the tube 4. Furthermore, the piezoelectric speaker 1 does not affect the alarm sound generator 3.

Second Embodiment

A second embodiment will be described with reference to FIGS. 5A and 5B. In the first embodiment, the sound pressure of the notification sound (especially the sound pressure of the low-pitched sound) is raised by making the notification sound to pass through the acoustic tube 4. The sound pressure may be more raised by increasing the amplification rate of the piezoelectric speaker 1.

However, in the second embodiment, the sound pressure of the notification sound is raised without raising the amplification rate of the piezoelectric speaker 1. Specifically, a resonant frequency peculiar to the piezoelectric speaker 1 is made in agreement with a resonant frequency peculiar to the acoustic tube 4 of the alarm device 2. The resonant frequency peculiar to the acoustic tube 4 will be referred as resonance peak frequency in order to distinguish from the other.

A possibility that the resonant frequency peculiar to the piezoelectric speaker 1 is in agreement with the resonance peak frequency peculiar to the acoustic tube 4 by chance is small, when there is no conception that the resonant frequency of the piezoelectric speaker 1 is made to agree with the resonance peak frequency of the acoustic tube 4.

The resonance peak frequency peculiar to the acoustic tube 4 may be made to agree with the resonant frequency peculiar to the piezoelectric speaker 1 by changing the length of the acoustic tube 4. In this case, it is necessary to renovate the acoustic tube 4, thereby causing increase in the cost of the vehicle presence notification apparatus, as a result. Further, a tone required for the alarm device 2 is also changed.

Alternatively, the resonant frequency peculiar to the piezoelectric speaker 1 may be made to agree with the resonance peak frequency peculiar to the acoustic tube 4 by changing a parameter of the vibration system of the piezoelectric speaker 1. In this case, it is necessary to newly establish a piezoelectric speaker 1 for exclusive use, thereby causing increase in the cost of the vehicle presence notification apparatus, as a result.

In the second embodiment, the vehicle presence notification apparatus has a housing 21 accommodating the piezoelectric speaker 1, and the housing 21 has a communication port 22. The housing 21 surrounds the acoustic wave generated by the piezoelectric speaker 1. The acoustic wave emitted into the housing 21 is output into the acoustic tube 4 through the communication port 22. The communication port 22 is constructed by a through hole defined in a wall component which divides the inside of the housing 21 and the inside of the acoustic tube 4 from each other. A resonator is constructed by the housing 21 and the communication port 22.

Figure 5A:
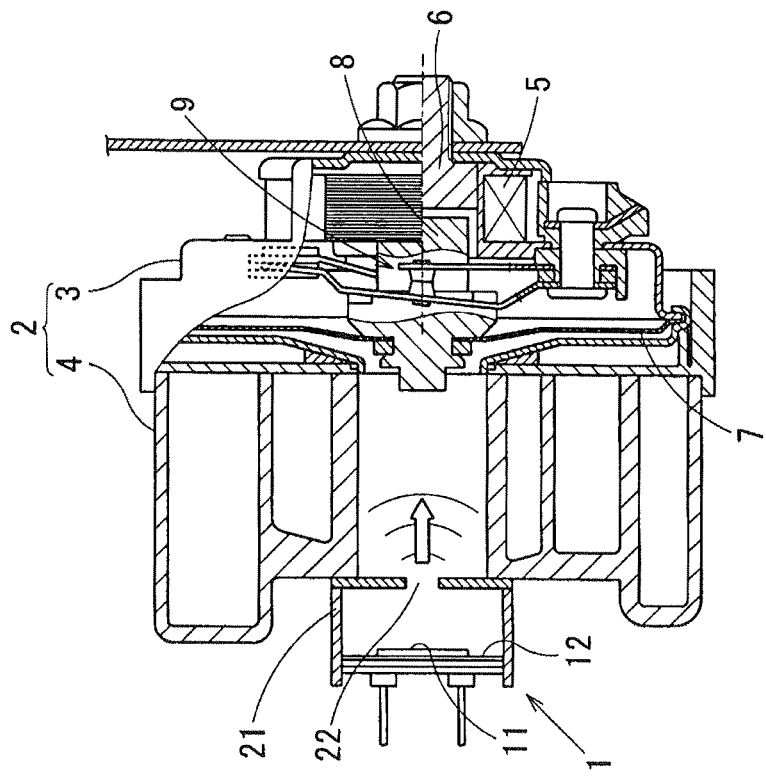
FIG. 5A and FIG. 5B are cross-sectional views illustrating a vehicle presence notification apparatus according to a second embodiment.
Figure 5B:
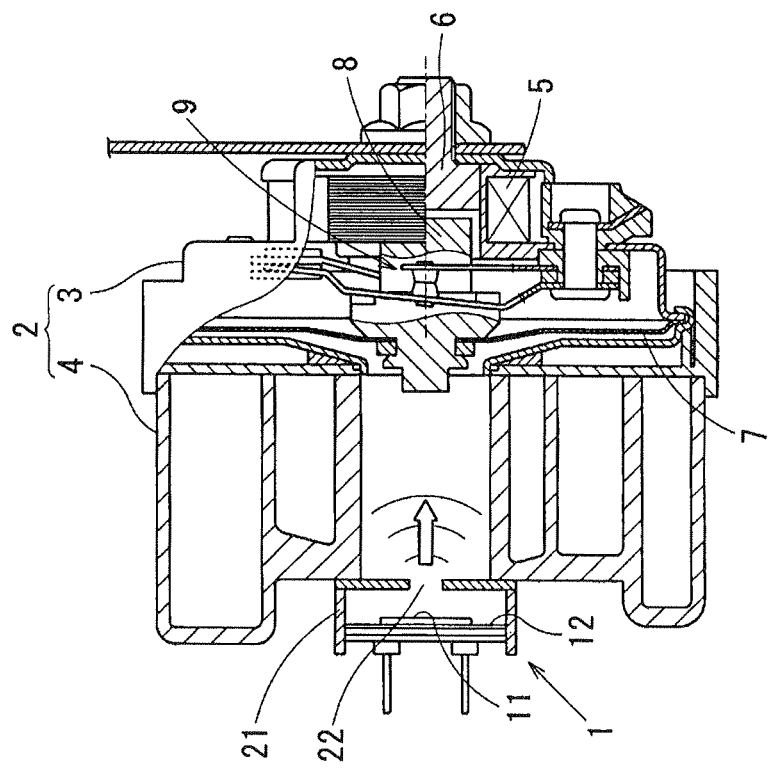

In FIGS. 5A and 5B, the housing 21 and the wall component having the communication port 22 are produced separately. However, the housing 21 and the wall component having the communication port 22 may be integrally produced. Moreover, the wall component having the communication port 22 may be constructed by a part of the acoustic tube 4, that is, the communication port 22 may be defined in a component constructing the acoustic tube 4.

In the second embodiment, at least one of an inside volume V of the housing 21, a port length L of the communication port 22, and an aperture area S of the communication port 22 is changed in a manner that the resonant frequency f of the resonator constructed by the housing 21 and the communication port 22 agrees with the resonance peak frequency ωx peculiar to the acoustic tube 4. The port length L may correspond to a thickness of the wall component having the communication port 22, because the communication port 22 is a through hole defined in the wall component.

As shown in a difference between FIG. 5A corresponding to the first embodiment and FIG. 5B corresponding to the second embodiment, the inside volume V of the housing 21 is increased in a manner that the resonant frequency f of the resonator constructed by the housing 21 and the communication port 22 agrees with the resonance peak frequency ωx peculiar to the acoustic tube 4.

The following represents Helmholtz's formula calculating the resonant frequency f.

$$f=(c/2\pi)\sqrt{\{S/(V \times L)\}}$$

In the second embodiment, the volume V in the Helmholtz's formula is changed so as to achieve that the resonant frequency f of the resonator equals to the resonance peak frequency ωx. In addition, c in the Helmholtz's formula represents an acoustic velocity, and π in the Helmholtz's formula represents a circular constant.

The resonance peak frequency ωx will be explained more to details. The resonance peak frequency peculiar to the acoustic tube 4 is constructed by plural frequencies such as the minimum resonance peak frequency (ω0), the primary resonance peak frequency (ω1), the secondary resonance peak frequency (ω2), the third resonance peak frequency (ω3) and the like.

A target (arbitrary) resonance peak frequency ωx is chosen from the plural frequencies in a manner that the target frequency becomes the nearest to a frequency of the notification sound whose sound pressure is required to be raised.

In the second embodiment, the inside volume V of the housing 21 is changed in the Helmholtz's formula $f=(c/2\pi)\sqrt{\{S/(V \times L)\}}$ so as to attain that the resonant frequency f of the resonator becomes equal to the target resonance peak frequency ωx.

In addition, the resonant frequency f of the resonator may be changed by changing the port length L and the aperture area S of the communication port 22, instead of the inside volume V of the housing 21.

According to the second embodiment, the resonant frequency f of the resonator is made to agree with the target resonance peak frequency ωx. Therefore, the sound pressure of the notification sound (specifically, the sound pressure of the target resonance peak frequency ωx) can be raised only by changing the volume V of the housing 21. In other words, the sound pressure of a predetermined frequency, which is selected based on the target resonance peak frequency ωx, can be raised without raising the amplification rate of the piezoelectric speaker 1, without newly establishing the piezoelectric speaker 1 for exclusive use, or without changing the length of the acoustic tube 4.

Third Embodiment

A third embodiment will be described with reference to FIG. 6.

In the third embodiment, the control device 10 controls not only the piezoelectric speaker 1 but also the alarm sound generator 3. Specifically, (i) when a horn button is operated, the control device 10 controls the alarm sound generator 3 of the alarm device 2 to produce a warning sound with high sound pressure, and (ii) when a notification sound is generated from the piezoelectric speaker 1, the control device 10 also controls the alarm sound generator 3 to produce a notification sound.

When a self excitation voltage is applied to the alarm sound generator 3, the current interrupter 9 intermittently energizes the coil 5, and the warning sound with high sound pressure is generated. The self excitation voltage may be more than or equal to 8V as a threshold value.

When the horn button is operated by an occupant of the vehicle, the control device 10 impresses the self excitation voltage of, for example, 12V from a battery of the vehicle to the alarm sound generator 3, therefore the warning sound with high sound pressure is generated from the alarm device 2.

In contrast, when a separate excitation voltage is applied to the alarm sound generator 3, the current interrupter 9 does not conduct the intermittent energizing of the coil 5. The separate excitation voltage is less than 8V, that is, lower than the self excitation voltage. When the coil 5 is driven by an audio signal defined by the separate excitation voltage, the diaphragm 7 vibrates according to the audio signal, and the alarm sound generator 3 generates an acoustic wave according to the audio signal. That is, the alarm sound generator 3 works as a speaker, at this time. The control device 10 controls another power amplifier different from the driving amplifier 15 to amplify the frequency signal instructing the notification sound output from the sound generator 14 so as to energize the coil 5. Therefore, a notification sound is generated from the alarm sound generator 3 also simultaneously as the piezoelectric speaker 1.

According to the third embodiment, the notification sound is simultaneously generated from both the piezoelectric speaker 1 and the alarm sound generator 3. The sound pressure of the notification sound can be easily raised rather than the case where only the piezoelectric speaker 1 is used. The third embodiment may be combined with the first embodiment and/or the second embodiment.

Moreover, in the third embodiment, the vehicle presence notification apparatus generates an answer back sound, as an example of a sound different from the notification sound, from the piezoelectric speaker 1 based on an operation instruction output from a management system 31 of the vehicle which has a function of a keyless locking device. The management system 31 is an apparatus different from the vehicle presence notification apparatus, and manages, for example, a door of the vehicle. Furthermore, the management system 31 may have an antitheft or antigroper function.

Figure 6:
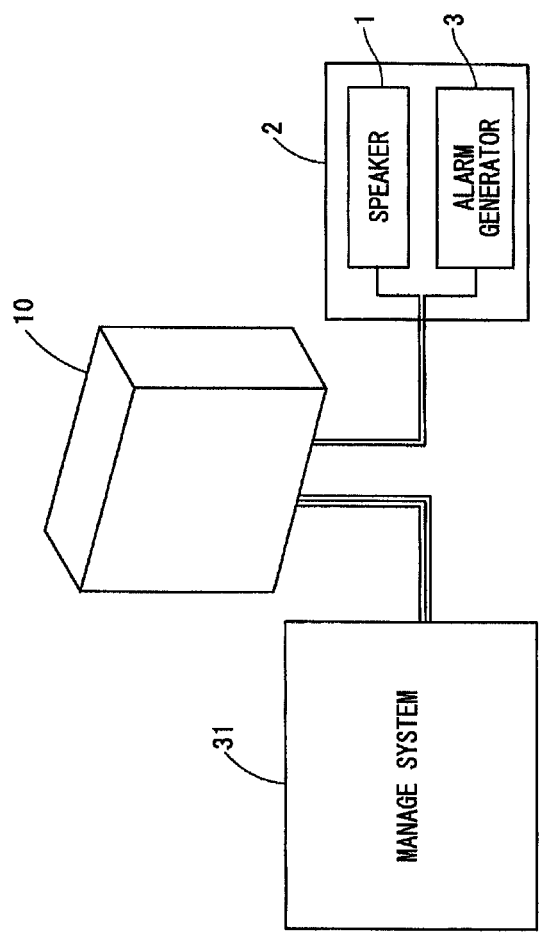
FIG. 6 is an explanatory view illustrating a vehicle presence notification apparatus according to a third embodiment which is connected to a management system through a control device.

Specifically, as shown in FIG. 6, the control device 10 which controls the piezoelectric speaker 1 is connected to the management system 31. Specifically, the control device 10 is connected to a control circuit of the management system 31.

The management system 31 is configured to
(i) output a lock signal to the control device 10 to tell that the door has been locked, when the keyless locking device carries out a locking for the door, and
(ii) output an unlocking signal to the control device 10 to tell that the door has been unlocked, when the keyless locking device carries out an unlocking for the door.

The sound generator 14 of the third embodiment is configured to output, in addition to the notification sound explained in the first embodiment,
(i) a frequency signal instructing a lock answer sound to tell that the door has been locked (for example, audio signal for generating a short alarm sound twice), and
(ii) a frequency signal instructing an unlocking answer sound to tell that the door has been unlocked (for example, audio signal for generating a short alarm sound once).

When the lock signal is provided to the control device 10 from the management system 31, the sound generator 14 generates the frequency signal instructing the lock answer sound, and the lock answer sound is generated from the piezoelectric speaker 1. At this time, the alarm sound generator 3 is driven by the separate excitation voltage, and the lock answer sound is generated also from the alarm sound generator 3.

Moreover, when the unlocking signal is provided to the control device 10 from the management system 31, the sound generator 14 generates the frequency signal instructing the unlocking answer sound, and the unlocking answer sound is generated from the piezoelectric speaker 1. At this time, the alarm sound generator 3 is driven by the separate excitation voltage, and the unlocking answer sound is generated also from the alarm sound generator 3.

According to the third embodiment, the vehicle presence notification apparatus of the third embodiment generates the answer back sound based on the instruction output from the management system 31 (keyless locking device), in addition to the notification sound notifying an approach of the vehicle. Thereby, a sound wave generator such as answer buzzer mounted for exclusive use to the keyless locking device can be abolished. As a result, it becomes easy to mount the keyless locking device to the vehicle, and the cost of the vehicle equipped with the keyless locking device can be reduced.

As a modification example in the third embodiment, voice information (warning) such as "the door is not closed" or "the sunroof is open" may be output from at least one of the piezoelectric speaker 1 and the alarm sound generator 3.

In a conventional keyless locking device, because the answer back sound is generated from a buzzer, only little information has been generated. However, according to the modification example, many information can be provided by generating the voice information using the piezoelectric speaker 1 and the alarm sound generator 3.

Moreover, the vehicle presence notification apparatus generates a warning sound which is prioritized in the sound pressure from the alarm device 2 based on an operation instruction output from the management system 31 (an example of an apparatus different from the horn button) which has the antitheft function as an antitheft device.

The management system 31 is configured to generate a theft detection signal to the control device 10 for telling that the antitheft device acts when it is determined that the antitheft device is turned on.

The control device 10 of the third embodiment performs energization control for not only the piezoelectric speaker 1 but also the alarm sound generator 3. The control device 10 (i) controls the alarm sound generator 3 to generate the warning sound with high sound pressure from the alarm device 2 by impressing the self excitation voltage, when the horn button is turned on, and (ii) controls the alarm sound generator 3 to generate the warning sound with high sound pressure from the alarm device 2 by impressing the self excitation voltage, when the theft detection signal is input into the control device 10 from the management system 31, similarly to when the horn button is turned on.

According to the third embodiment, the vehicle presence notification apparatus generates the warning sound based on the operation instruction output from the management system 31 (antitheft device), in addition to the instruction output from the horn button.

Thereby, compared with the conventional technology, a warning sound generator such as crime prevention alarm equipped for exclusive use can be eliminated for the antitheft device. As a result, it becomes easy to mount the antitheft device to the vehicle, and the cost of the vehicle equipped with the antitheft device can be reduced.

As a modification example in the third embodiment, the management system 31 may have an antigroper function, and a warning sound may be generated from the alarm device 2 with priority in the sound pressure.

Specifically, when an operating signal of a crime prevention switch (for example, which is mounted to an operation key of the vehicle as alarm switch) is input into the control device 10 from the management system 31, the control device 10 impresses the self excitation voltage to the alarm sound generator 3 similarly to when the horn button is turned on, therefore the warning sound with high sound pressure is generated from the alarm device 2.

Other Embodiments

In the above embodiments, one piezoelectric speaker 1 is attached to the acoustic tube 4. Alternatively, plural piezoelectric speakers 1 may be attached to the acoustic tube 4 so as to raise the sound pressure of the notification sound.

In the above embodiments, the piezoelectric speaker 1 is used as an example of a dynamic speaker. However, other small-sized speaker such as cone speaker may be used instead of the piezoelectric speaker 1 which directly emits an audible sound.

In the above embodiments, the notification sound is generated by a dynamic speaker (e.g., piezoelectric speaker 1). Alternatively, a parametric speaker may be mounted in addition to the dynamic speaker. Both the notification sound generated by the dynamic speaker through the acoustic tube 4 and the notification sound generated by the parametric speaker may be emitted outward from the vehicle.

When the alarm sound generator 3 is in active, the dynamic speaker may also be operated simultaneously so as to control the tone of the warning sound (frequency of the warning sound) by the operation of the dynamic speaker.

Such changes and modifications are to be understood as being within the scope of the present disclosure as defined by the appended claims.

What is claimed is:

1. A vehicle presence notification apparatus notifying a presence of a vehicle, the vehicle presence notification apparatus comprising:
   an alarm device including
      an alarm generator generating an alarm sound, and
      an acoustic tube through which the alarm sound is emitted outside of the vehicle;
   a dynamic speaker generating a notification sound with audible frequency; and
   a control device which controls the dynamic speaker, wherein
   the dynamic speaker generates a sound different from the notification sound based on an operation signal output form an apparatus different from the vehicle presence notification apparatus,
   the dynamic speaker is fixed to the acoustic tube and emits the notification sound inside of the acoustic tube, such that the notification sound is generated outside of the vehicle through the acoustic tube,
   the dynamic speaker is constructed of a piezoelectric speaker generating an audible sound,
   the acoustic tube is constructed of a swirl-shaped horn,
   the dynamic speaker is disposed to oppose to the alarm generator through the acoustic tube,
   the acoustic tube has a first side surface and a second side surface which are perpendicular to an axis of the swirl-shaped horn passing through a center of the swirl-shaped horn,
   the alarm generator is fixed to the first side surface,
   the dynamic speaker is fixed to the second side surface,
   the control device is connected to a management system of the vehicle, and
   the management system outputs a lock/unlock signal to the control device, and a sound generator of the control device generates an answer back sound different from the notification sound, when a keyless locking device lock/unlocks a door of the vehicle.

2. A vehicle presence notification apparatus notifying a presence of a vehicle, the vehicle presence notification apparatus comprising:
   an alarm device including
      an alarm generator generating an alarm sound, wherein the alarm generator generates a warning sound based on an operation signal output from an apparatus different from a horn button that is operated by an occupant of the vehicle, and
      an acoustic tube through which the alarm sound is emitted outside of the vehicle; and a dynamic speaker generating a notification sound with audible frequency, wherein
the dynamic speaker is fixed to the acoustic tube and emits the notification sound inside of the acoustic tube, such that the notification sound is generated outside of the vehicle through the acoustic tube,
they dynamic speaker is constructed of a piezoelectric speaker generating an audible sound,
the acoustic tube is constructed of a swirl-shaped horn,
the dynamic speaker is disposed to oppose to the alarm generator through the acoustic tube,
the acoustic tube has a first side surface and a second side surface which are perpendicular to an axis of the swirl-shaped horn passing through a center of the swirl-shaped horn,
the alarm generator is fixed to the first side surface,
the dynamic speaker is fixed to the second side surface, and
a control device which controls the alarm generator, wherein
the control device is connected to a management system of the vehicle, and
the management system outputs a lock/unlock signal to the control device, and the control device generates a sound different from the warning sound by driving the alarm generator with a separate excitation voltage when a keyless locking device locks/unlocks a door of the vehicle.

3. A vehicle presence notification apparatus notifying a presence of a vehicle, the vehicle presence notification apparatus comprising:
   an alarm including
      an alarm generator generating an alarm sound, and
      an acoustic tube through which the alarm sound is emitted outside of the vehicle; and
   a dynamic speaker generating a notification sound with audible frequency,
   a control device which controls both the dynamic speaker and the alarm generator, wherein
the dynamic speaker is fixed to the acoustic tube and emits the notification sound inside of the acoustic tube, such that the notification sound is generated outside of the vehicle through the acoustic tube,
the dynamic speaker is constructed of a piezoelectric speaker generating an audible sound,
the acoustic tube is constructed of a swirl-shaped horn,
the dynamic speaker is disposed to oppose to the alarm generator through the acoustic tube,
the acoustic tube has a first side surface and a second side surface which are perpendicular to an axis of the swirl-shaped horn passing through a center of the swirl-shaped horn,
the alarm generator is fixed to the first side surface,
the dynamic speaker is fixed to the second side surface, wherein
the control device controls the alarm generator to produce a first warning sound when a horn switch of the vehicle is operated,
the control device controls the alarm generator to produce a first notification sound when a second notification sound is generated from the dynamic speaker,
the control device controls the alarm generator to produce a second warning sound by applying a self excitation voltage which is higher than or equal to a threshold value when the horn switch of the vehicle is operated, and
the control device controls the alarm generator to produce the first notification sound by applying a separate excitation voltage which is lower than the threshold value so as to generate an acoustic wave according to an audio signal when the second notification sound is generated from the dynamic speaker.

\* \* \* \* \*